Aug. 2, 1932.  J. C. MacLACHLAN  1,869,384

DISTRIBUTING HEAD FOR LIQUID OR SEMILIQUID MATERIAL

Filed Oct. 20, 1930

Inventor
John C. MacLachlan
By Reif & Braddock
Attorneys

Patented Aug. 2, 1932

1,869,384

UNITED STATES PATENT OFFICE

JOHN C. MacLACHLAN, OF CHICAGO, ILLINOIS

DISTRIBUTING HEAD FOR LIQUID OR SEMILIQUID MATERIAL

Application filed October 20, 1930. Serial No. 489,895.

This invention relates to a drying apparatus, and particularly to a distributing head for delivering material to be dried. In the drying method in which the material is sprayed into a large drying cabinet, it is desirable to have material projected into the cabinet in a very finely divided condition, and to have a sufficient quantity of material delivered. The invention herein disclosed is in some respects an improvement upon that shown in applicant's prior Patent No. 1,742,478, granted January 7, 1930, and upon that disclosed in his pending application S. N. 458,025, filed May 31, 1930. With such distributing heads as shown in said patent application, with certain kinds of material the material does not pass out to the distributing disk in the desired quantities.

It is an object of this invention, therefore, to provide a distributing head having a surface to which the fluid or semi-fluid material is delivered, a feeding means at the central portion of said head, and a spreader device for dividing and distributing the material received from the feeding means to the said surface.

It is a further object of the invention to provide a distributing head having a member with a concave under surface, a chamber above the central portion of said member, a feeding means delivering to said member, and a disk at the bottom of said chamber having a spreading means thereon for receiving the material and delivering the same to said under surface of said member, substantially without impact.

It is more specifically an object of the invention to provide a distributing head comprising a member of concavo-convex form, having angularly disposed blades at its outer edge and an under surface adapted to receive material, said member having a chamber above its central portion, a pipe delivering material to said chamber, and a disk receiving material from said chamber having radially disposed spaced ribs thereon for spreading the material and delivering it to the concave surface of said member substantially without impact.

These and other objects and advantages of the invention will be fully set forth in the following description made in connection with the accompanying drawing, in which like reference characters refer to similar parts throughout the several views, and in which:—

Figure 1:
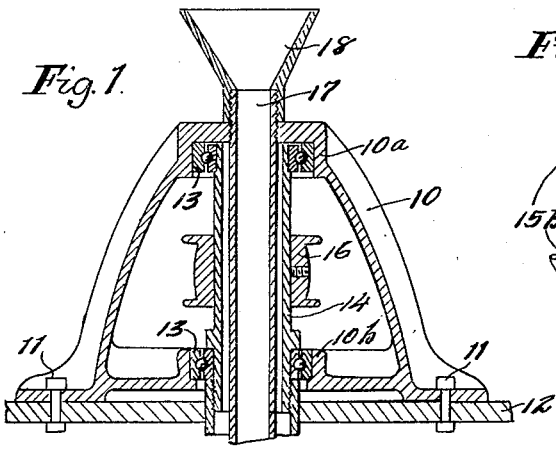
Fig. 1 is a vertical section through the distributing head embodying the present invention.
Figure 2:
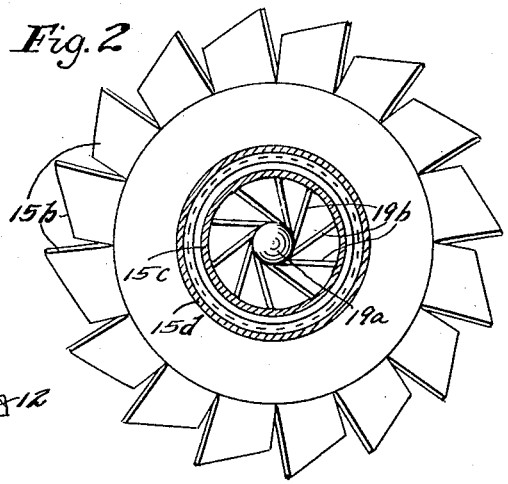
Fig. 2 is a horizontal section taken on line 2—2 of Fig. 1, as indicated by the arrows.

Referring to the drawing, in Figs. 1 and 2 a distributing head is shown, comprising a bracket 10 adapted to be secured by suitable bolts 11 to the top 12 of a drying cabinet. The bracket 10 has bearing portions 10a and 10b adjacent the top and bottom thereof, in which are disposed the bearings 13 illustrated as of the ball bearing type. A conduit or tube 14 is carried in the bearings 13 and extends through the lower end of bracket 10 and through the top 12 of the cabinet, said tube having secured to its lower end a distributing member 15. Tube 14 is shown as in two parts, threaded together, the upper one having a shoulder resting on the lower bearing 13. The member 15 is threaded on the lower end of conduit 14. Conduit 14 also has secured thereto a flanged pulley 16 adapted to receive a belt driven from a suitable motor for revolving the conduit 14. A smaller pipe 17 extends down through conduit 14, some distance below the end thereof, and has secured to its upper end the hopper or receptacle 18, the latter being shown as threaded onto tube 17 and resting on top of bearing 10. The member 15 has a concavo-convex portion 15a at its lower end, the edge of which is formed into a plurality of spaced and angularly disposed blades 15b. Said member also has a chamber forming dome-like portion 15c at its center, having at its upper end the hub which screws on to conduit 14. Member 15 also has an outer conical portion 15d extending from its upper end to a point intermediate portion 15a. This portion 15d forms a chamber 15e about chamber 15c, which acts as an insulating chamber. Adjacent the bottom of chamber formed by portion 15c, is a disk 19 having at its center an upstanding portion 19a terminating in a conical point, said disk having ribs 19b extending from the bottom conical portion 19a to the edge of the disk, said ribs and the edge of the disk being shown as in one line. The member 19 is supported by a plurality of spaced brackets 20 secured to the under side thereof and to the under side of portion 15a.

In operation the fluid or semi-fluid material will be discharged into the hopper 18 and conduit 14 and member 15 will be rotated at high speed. The material passes down through pipe 17 onto the member 19 and is sprayed and distributed by said member which is rotating. The material is divided and urged outwardly by the ribs 19b and the material passes from the outer edge of disk 19 between said edge and the under surface of portion 15a of member 15 and is received on said under surface substantially without impact. The material is thus formed into a film and passes onto the blades 15b. The material is finely divided by the action of the blades 15b and the action of the air thereon, and is finally discharged in a very finely divided condition in an umbrella-like shower from the lower edge of the member 15. The member 19 with the ribs 19b thereon acts to speed up the delivery of the material from the chamber in portion 15c and distributes the material rapidly to portion 15a.

Figure 3:
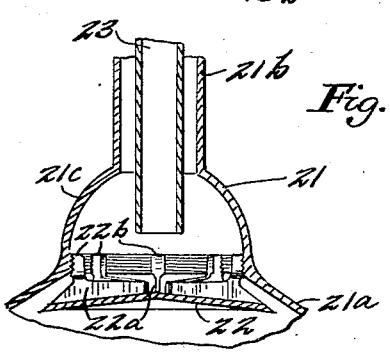
Fig. 3 is a partial view similar to Fig. 1, showing a modified form of the invention.
Figure 4:
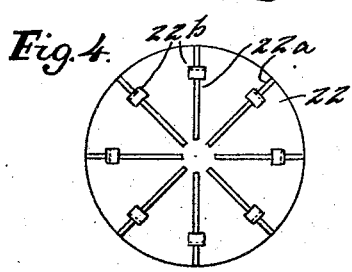
Fig. 4 is a top plan view of the distributing disk used in the structure shown in Fig. 3.

In Figs. 3 and 4 a modified form of the invention is shown. A member 21 is provided, having the lower portion 21a which will be substantially the same as the portion 15a of member 15. Member 21 is shown as having at its upper end a conduit 21b which corresponds to the conduit 14 shown in Fig. 1, and which will be rotated as shown in Fig. 1. The member 21 also includes the intermediate portion 21c shown as substantially dome-shaped, and forming a chamber above the central part of portion 21a. Member 21 has secured therein adjacent the bottom of portion 21c, a disk 22. Disk 22 is shown as somewhat conical in form, having its center higher than its edges and the same has on its upper surface a plurality of narrow ribs 22a diverging outwardly from the central portion of disk 22 substantially radially. Ribs 22a are shown as terminating short of the center of disk 22. Each rib 22a is continued upwardly adjacent its outer edge and formed into a lug 22b, which lugs are externally threaded and adapted to screw into the lower threaded part of portion 21c.

As clearly shown in Fig. 3, the inner ends of ribs 22a are vertical, while their outer edges incline downwardly toward the edge of disk 22. A pipe or tube 23 extends downwardly through the conduit 21b, terminating some distance above disk 22. Tube 23 will be stationary, and the same corresponds to tube 17 shown in Fig. 1.

In operation, the member 21 will be rotated at high speed and the material will be fed thereto through the tube 23. The material is received in the chamber in portion 21c and also passes onto the disk 22. The material is divided and distributed by member 22 and the ribs 22a thereon and thrown outwardly to the under surface of portion 21a. The edge of disk 22 extends quite close to said under surface and the material is delivered to portion 21a substantially without impact. Portion 21a will have blades similar to the blades 15b at its lower end and the material is divided and discharged from these blades in very finely divided condition.

Figure 5:
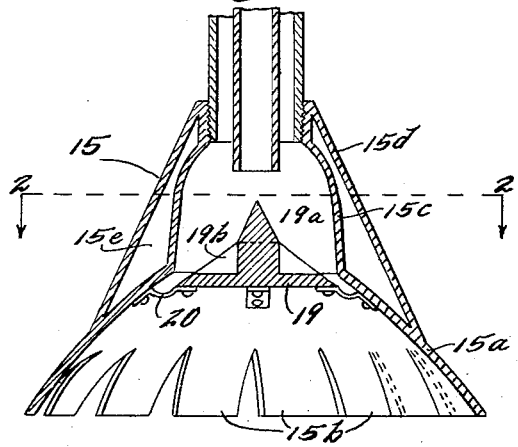
Fig. 5 is a partial view also similar to Fig. 1, showing a further modification.
Figure 5:
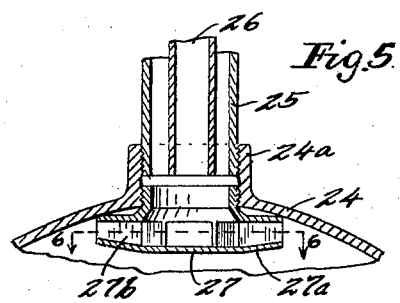
Figure 6:
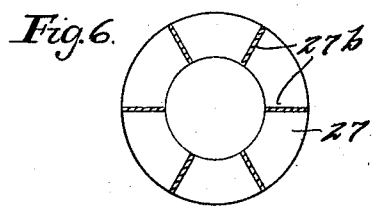
Fig. 6 is a horizontal section taken on line 6—6 of Fig. 5, as indicated by the arrows.

In Figs. 5 and 6 another form of distributor is shown comprising a member 24 illustrated as of concavo-convex form, having a central tube 24a which is threaded onto the lower end of conduit 25. Conduit 25 will correspond to the conduit 14 shown in Fig. 1 and will, like conduit 14, be arranged to be rotated. The tube 26 extends into the conduit 25 terminating substantially at the lower end of the latter and this tube will be stationary, the same corresponding to tube 17 shown in Fig. 1. The hub 24a has threaded into its lower portion a spreader or distributing member 27. This member has a disk-like bottom portion 27a connected to its top portion by a plurality of spaced narrow ribs 27b. Member 24 will, like member 15, be provided with a plurality of spaced blades at its outer edge, similar to the blades 15b.

In operation the material is fed into the tube 26, the conduit 25 and member 24 being rotated at high speed. The material passes into the chamber formed in the hub 24a and the hub of member 27 and passes downwardly and outwardly between the ribs 27b. The material will be divided, spread and passed outwardly by the member 27 and the ribs 27b and will be delivered to the under surface of member 24 substantially without impact. The material passes out to the outer edge of member 24 and is finely discharged in finely divided condition.

Figure 7:
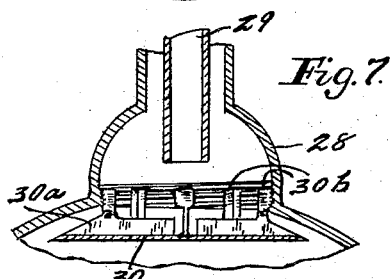
Fig. 7 is still another modification.

In Fig. 7 a modification is shown, comprising a member 28 similar in all respects to member 21 shown in Fig. 3. A stationary feeding pipe 29 similar to pipe 23 extends into member 28. A spreader or distributing member 30 is shown comprising a flat disk having ribs 30a disposed as are the ribs 22a of member 22 shown in Figs. 3 and 4. Ribs 30a, however, have their top edges parallel with the disk 30 inside of the lugs 30b, which lugs are similar to the lugs 22b. The outer ends of ribs 30a incline to the edge of the disk 30, said ribs and edge being in one line.

The operation of the device shown in Fig. 7 is substantially the same as that shown in Figs. 3 and 4, except that the material passes along the flat disk 30 and is spread and distributed by the ribs 30a to the under surface of the member 28.

From the above description it is seen that applicant has provided a simple and efficient distributing head for distributing and dividing material for projection into a drying cabinet. The head efficiently divides and projects the material and the material is rapidly delivered to the head from the feeding means. There is no tendency for the material to back up into the feeding pipe, but the same flows continuously out to the edge of the distributing member, giving a continuous flow and large capacity. In the device shown in Fig. 1, chamber 15e acts to insulate the portions 15c and the upper portion of member 15a from the heated air which is blown into the cabinet. The insulating effect eliminates any tendency of milk, for example, to dry on the inner sides of member 15.

The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A distributing head for a drying apparatus having in combination, a revoluble member having a concave under side adapted to receive and centrifugally discharge material, a conduit at the central portion of said member for feeding material, and a disk below said conduit having ribs on its upper surface, said ribs extending outwardly from the central portion of said disk to the edge of said disk, being disposed closely adjacent the under side of said member.

2. A distributing head for a drying apparatus having in combination, a concavo-convex member having annularly disposed blades at its outer edge, a liquid-receiving chamber at the central portion of said member, a central pipe for feeding material to said chamber, a disk carried by said member adjacent the bottom of said chamber and having radially disposed ribs on its upper surface adapted to spread and distribute material to the under surface of said concavo-convex member, substantially without impact.

3. A distributing head for a drying apparatus having in combination, a member revoluble about a vertical axis having a surface adapted to receive material to be centrifugally discharged, a feeding means at the central portion of said member, and a spreader member beneath and spaced from said feeding means and spaced from said surface comprising a disk having diverging ribs extending outwardly from its central portion, said ribs increasing in height from their inner ends outwardly.

4. The structure set forth in claim 3, said disk sloping downwardly from its center towards its outer edge.

5. A distributing head for a drying apparatus having in combination, a member revoluble about a vertical axis having a surface adapted to receive material to be centrifugally discharged, feeding means at the central portion of said member, and a spreader member spaced from and beneath said feeding means and spaced from said surface comprising a disk having diverging ribs extending outwardly from its central portion, said ribs tapering in height at their outer ends to the edge of said disk.

6. The structure set forth in claim 5, the edge of said disk being beveled substantially in line with the inclined ends of said ribs.

7. A distributing head for a drying apparatus having in combination, a distributing member revoluble about a vertical axis having an under surface for receiving material to be centrifugally discharged, a feeding means, and a spreading means spaced from said surface including diverging ribs extending outwardly for receiving material from said feeding means and delivering said material to said surface substantially without impact.

8. A distributing head comprising an intermediate portion having a chamber therein, a tubular portion leading upwardly from said first mentioned portion adapted to be rotated to rotate said head, a plate-like portion carried by said first mentioned portion forming the bottom of said chamber, and having ribs extending inwardly from its edge forming passages therebetween extending outwardly below said first mentioned portion, and a plurality of spaced members extending outwardly and downwardly from said first mentioned portion to which material is thrown outwardly through said passages.

9. A distributing head comprising an intermediate portion having a chamber therein, a tubular portion leading upwardly from said first mentioned portion adapted to be rotated to rotate said head, a plate-like portion carried by said first mentioned portion forming the bottom of said chamber, having circumferentially spaced ribs extending outward to the edge thereof forming passages therebetween, and a plurality of circumferentially spaced members extending outwardly and downwardly at the lower portion of said head to which the material is delivered and by which it is disintegrated in the rotation of said head.

10. A distributing head having in combination, a plurality of spaced members extending outwardly and downwardly in substantially a conical surface for disintegrating material, and means for feeding material to said members including a central member having a flat top with circumferentially spaced diverging ribs extending outwardly thereon forming passages therebetween, said head having an upwardly extending tubular portion through which material passes to said central member.

11. A distributing head having in combination, an intermediate portion having a chamber therein, a plurality of spaced members extending outwardly and downwardly at the lower portion thereof, said first mentioned portion having an internally threaded bore, a feeding member having a flange screwed into said bore and having an upper surface disposed at the lower part of said chamber having spaced outwardly extending ribs upstanding thereon forming circumferentially spaced channels through which material is propelled, said material passing to said first mentioned members to be disintegrated thereby.

JOHN C. MacLACHLAN.